US008514215B2

(12) United States Patent
Cases et al.

(10) Patent No.: US 8,514,215 B2
(45) Date of Patent: Aug. 20, 2013

(54) DYNAMICALLY MANAGING POWER CONSUMPTION OF A COMPUTER WITH GRAPHICS ADAPTER CONFIGURATIONS

(75) Inventors: Moises Cases, Austin, TX (US); Bhyrav M. Mutnury, Austin, TX (US); William G. Pagan, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1110 days.

(21) Appl. No.: 12/269,160

(22) Filed: Nov. 12, 2008

(65) Prior Publication Data

US 2010/0118019 A1    May 13, 2010

(51) Int. Cl.
*G09G 5/00*    (2006.01)

(52) U.S. Cl.
USPC ........... 345/212; 345/204; 345/207; 345/209; 345/211; 345/213

(58) Field of Classification Search
USPC .......... 345/1.1, 501–512, 204–213; 719/315, 719/318, 328; 710/305, 316; 715/760, 810, 715/835; 713/320, 322
See application file for complete search history.

(56) References Cited

U.S. PATENT DOCUMENTS

| | | |
|---|---|---|
| 3,602,703 A | 8/1971 | Polenz |
| 5,623,450 A | 4/1997 | Phillips et al. |
| 5,630,148 A | 5/1997 | Norris |
| 5,719,800 A | 2/1998 | Mittal et al. |
| 5,745,375 A | 4/1998 | Reinhardt et al. |
| 5,812,860 A | 9/1998 | Horden et al. |
| 5,941,991 A | 8/1999 | Kageshima |
| 6,002,878 A | 12/1999 | Gehman et al. |
| 6,038,636 A | 3/2000 | Brown, III et al. |
| 6,125,334 A | 9/2000 | Hurd |

(Continued)

FOREIGN PATENT DOCUMENTS

| | | |
|---|---|---|
| DE | 20 2004 018 289 | 3/2005 |
| DE | 20 2004 018 289 U1 | 3/2005 |

(Continued)

OTHER PUBLICATIONS

TDB-ACC-No. NN9502335 Disclosure Title: Method for Dynamically Balancing Computer Graphics Workload between Host Workstation Central Processing Unit and Dedicated Graphics Adapter Pub. Data: IBM Technical Disclos. Bullet., Feb. 1995, US vol. #: 38 Issue #: 2 p. 335-338 Feb. 1, 1995.*

(Continued)

*Primary Examiner* — Prabodh M Dharia
(74) *Attorney, Agent, or Firm* — H. Barrett Spraggins; Cynthia G. Seal; Biggers & Ohanian, LLP

(57) ABSTRACT

Dynamically managing power consumption of a computer, the computer including two or more graphics adapters, the computer having a number of graphics adapter configurations including one or more of the graphics adapters, where managing power consumption includes: monitoring, by a graphics driver, operation of a current graphics adapter configuration, the operation characterized by a graphics processing load; determining, in dependence upon the graphics processing load, whether operation of the current graphics adapter configuration conforms to predefined graphics processing criteria; if operation conforms, processing graphics, by the graphics adapter, for display with the one or more graphics adapters of the current graphics adapter configuration; and if operation does not conform, processing graphics, by the graphics adapter, for display with the one or more graphics adapters of another graphics adapter configuration.

20 Claims, 6 Drawing Sheets

(56) References Cited

U.S. PATENT DOCUMENTS

| | | | |
|---|---|---|---|
| 6,141,021 A | 10/2000 | Bickford et al. | |
| 6,385,113 B1 | 5/2002 | Longwell et al. | |
| 6,513,145 B1 | 1/2003 | Venkitakrishnan | |
| 6,624,816 B1 | 9/2003 | Jones, Jr. | |
| 6,628,469 B1 | 9/2003 | Hoyt | |
| 6,651,082 B1* | 11/2003 | Kawase et al. | 718/105 |
| 6,657,634 B1 | 12/2003 | Sinclair et al. | |
| 6,661,671 B1 | 12/2003 | Franke et al. | |
| 6,665,806 B1 | 12/2003 | Shimizu | |
| 6,732,067 B1* | 5/2004 | Powderly | 703/24 |
| 6,766,420 B2 | 7/2004 | Rawson, III | |
| 6,795,896 B1 | 9/2004 | Hart | |
| 6,820,222 B2 | 11/2004 | Swoboda | |
| 6,862,672 B1 | 3/2005 | Furudate et al. | |
| 6,916,815 B2 | 7/2005 | Vite et al. | |
| 7,002,884 B2 | 2/2006 | Schmidt et al. | |
| 7,010,656 B2 | 3/2006 | Gupta | |
| 7,036,030 B1 | 4/2006 | Altmejd | |
| 7,043,647 B2 | 5/2006 | Hansen et al. | |
| 7,069,463 B2 | 6/2006 | Oh | |
| 7,134,011 B2 | 11/2006 | Fung | |
| 7,155,621 B2 | 12/2006 | Dai | |
| 7,155,623 B2 | 12/2006 | Lefurgy et al. | |
| 7,219,241 B2 | 5/2007 | Cooper et al. | |
| 7,240,225 B2 | 7/2007 | Brewer et al. | |
| 7,284,067 B2 | 10/2007 | Leigh | |
| 7,318,164 B2 | 1/2008 | Rawson, III | |
| 7,345,689 B2 | 3/2008 | Janus et al. | |
| 7,444,526 B2 | 10/2008 | Felter et al. | |
| 7,516,348 B1 | 4/2009 | Ofer | |
| 7,559,066 B2* | 7/2009 | Ho et al. | 719/330 |
| 7,581,130 B2 | 8/2009 | Carroll et al. | |
| 7,623,131 B1* | 11/2009 | Johnson | 345/502 |
| 7,788,513 B2 | 8/2010 | Vaden | |
| 8,006,108 B2* | 8/2011 | Brey et al. | 713/320 |
| 8,307,220 B2* | 11/2012 | Brey et al. | 713/300 |
| 2001/0032298 A1 | 10/2001 | Emons | |
| 2001/0052902 A1* | 12/2001 | Ono et al. | 345/502 |
| 2002/0004912 A1 | 1/2002 | Fung | |
| 2002/0087896 A1 | 7/2002 | Cline et al. | |
| 2002/0133792 A1 | 9/2002 | Raghunathan et al. | |
| 2003/0051104 A1 | 3/2003 | Woo | |
| 2003/0056125 A1 | 3/2003 | O'Conner et al. | |
| 2003/0105984 A1 | 6/2003 | Masuyama et al. | |
| 2003/0112582 A1 | 6/2003 | Sanders et al. | |
| 2003/0117759 A1 | 6/2003 | Cooper | |
| 2003/0120772 A1 | 6/2003 | Husain et al. | |
| 2003/0125886 A1 | 7/2003 | Spitaels et al. | |
| 2003/0188222 A1 | 10/2003 | Abbondanzio et al. | |
| 2003/0229821 A1 | 12/2003 | Ma | |
| 2004/0003303 A1 | 1/2004 | Oehler et al. | |
| 2004/0024831 A1 | 2/2004 | Yang et al. | |
| 2004/0030939 A1 | 2/2004 | Barr et al. | |
| 2004/0030941 A1 | 2/2004 | Barr et al. | |
| 2004/0148060 A1 | 7/2004 | Lee | |
| 2004/0243886 A1 | 12/2004 | Klein | |
| 2004/0268166 A1 | 12/2004 | Farkas et al. | |
| 2005/0015632 A1 | 1/2005 | Chheda et al. | |
| 2005/0060590 A1 | 3/2005 | Bradley et al. | |
| 2005/0060591 A1 | 3/2005 | Yoshiyama et al. | |
| 2005/0102544 A1 | 5/2005 | Brewer et al. | |
| 2005/0134593 A1 | 6/2005 | Janus et al. | |
| 2005/0138438 A1 | 6/2005 | Bodas | |
| 2005/0229226 A1 | 10/2005 | Relan et al. | |
| 2005/0244131 A1 | 11/2005 | Uehara | |
| 2005/0262365 A1 | 11/2005 | Lint et al. | |
| 2005/0289361 A1 | 12/2005 | Sutardja | |
| 2005/0289362 A1 | 12/2005 | Merkin et al. | |
| 2005/0289367 A1 | 12/2005 | Clark et al. | |
| 2006/0007203 A1 | 1/2006 | Chen et al. | |
| 2006/0156041 A1 | 7/2006 | Zaretsky et al. | |
| 2006/0161794 A1 | 7/2006 | Chiasson et al. | |
| 2006/0190745 A1 | 8/2006 | Matsushima et al. | |
| 2006/0230299 A1 | 10/2006 | Zaretsky et al. | |
| 2006/0248354 A1 | 11/2006 | Pineda De Gyvez et al. | |
| 2006/0248356 A1 | 11/2006 | Won et al. | |
| 2006/0253715 A1 | 11/2006 | Ghiasi et al. | |
| 2007/0033425 A1 | 2/2007 | Clark | |
| 2007/0073969 A1 | 3/2007 | Guha et al. | |
| 2007/0162632 A1 | 7/2007 | Ng et al. | |
| 2007/0162692 A1 | 7/2007 | Nishimoto et al. | |
| 2007/0162776 A1 | 7/2007 | Carpenter et al. | |
| 2007/0208981 A1* | 9/2007 | Restrepo et al. | 714/731 |
| 2007/0245161 A1 | 10/2007 | Shaw et al. | |
| 2007/0260897 A1 | 11/2007 | Cochran et al. | |
| 2007/0268296 A1* | 11/2007 | Ledebohm et al. | 345/501 |
| 2008/0018653 A1 | 1/2008 | Liu | |
| 2008/0068287 A1* | 3/2008 | Day et al. | 345/1.2 |
| 2008/0077817 A1 | 3/2008 | Brundridge et al. | |
| 2008/0094403 A1 | 4/2008 | Bakalash et al. | |
| 2008/0204460 A1 | 8/2008 | Marinkovic et al. | |
| 2008/0211816 A1* | 9/2008 | Gonzalez et al. | 345/505 |
| 2008/0211826 A1 | 9/2008 | Gonzalez et al. | |
| 2008/0229050 A1 | 9/2008 | Tillgren | |
| 2008/0320203 A1 | 12/2008 | Fitzgerald | |
| 2009/0070611 A1 | 3/2009 | Bower et al. | |
| 2009/0089595 A1 | 4/2009 | Brey et al. | |
| 2009/0125737 A1* | 5/2009 | Brey et al. | 713/322 |
| 2009/0128570 A1* | 5/2009 | Chen | 345/505 |
| 2009/0132842 A1* | 5/2009 | Brey et al. | 713/322 |
| 2011/0090232 A1* | 4/2011 | Johnson | 345/506 |
| 2012/0105307 A1* | 5/2012 | Day et al. | 345/1.1 |

FOREIGN PATENT DOCUMENTS

| | | |
|---|---|---|
| WO | WO 2005/069148 | 7/2005 |
| WO | WO 2007/140404 | 12/2007 |
| WO | WO 2007/140404 A2 | 12/2007 |

OTHER PUBLICATIONS

Office Action, U.S. Appl. No. 12/269,160, USPTO Mail Date Oct. 7, 2011.

Final Office Action, U.S. Appl. No. 12/269,160, USPTO Mail Date Mar. 21, 2012.

http://ati.amd.com/technology/hybridgraphics/index.html.

TDB-ACC-No. NN9502335 Disclosure Title: Method for Dynamically Balancing Computer Graphics Workload between Host Workstation Central Processing Unit and Dedicated Graphics Adapter Pub Data: IBM Technical Disclos. Bullet., Feb. 1995. US vol. # 38 Issue #:2 p. #335-338 Feb. 1, 1995.

Office Action, U.S. Appl. No. 11/940,896, USPTO Mail Date Nov. 23, 2012.

Office Action, U.S. Appl. No. 12/269,160, USPTO Mail Date Oct. 1, 2012.

Pinheiro, et al.; Load Balancing and Unbalancing for Power and Performance in Cluster-Based Systems; pp. 4-1-4-8; Department of Computer Science, Rutgers University; Piscataway, NJ, May 2001.

Soteriou, et al.; Software-Directed Power-Aware Interconnection Networks; Department of Electrical Engineering, Princeton University; Sep. 24-27, 2005; pp. 274-285; CASES 2005; Princeton, NJ.

Koyangi et al.; Control of Spindle Motor Velocity in Load/Unload Hard Disk Drive; TDB v38 n12 12-95 p. 551-552; AAA95A062553; Japan.

Luecke; High-Speed/Low-Power Selectable Optical File; Research Disclosure n315 07-90; Jul. 1990; AAA90A963914; San Jose.

Otteson; Adaptive Just-In-Time Velocity profile Algorithm for Power Savings in a Direct Access Storage Device; TDB v41 n1 01-98 p. 733-736; AAA98A060205; Rochester, MN.

Mitchell; Memory: The New Power Hog; www.techworld.com/features/index.cfm?featureID=;3337; Apr. 2007.

Pisharath, et al; Reducing Energy Consumption of Queries in Memory-Resident Database Systems; International Conference on Compilers, Architectures and Synthesis of Embedded Systems; Sep. 23, 2004.

Dhiman et al.; Dynamic Power Management Using Machine Learning; ICCAD'06; Nov. 2006; ACM 1-59593-389-1/06/0011; San Jose, CA, USA.

Watts, et al.; Engineering Economics, Section 5, Chapter 7, SFPE Handbook of Fire Protection Engineering, NFPA, Quincy, MA 2002.

PCT Search Report and Written Opinion, Oct. 21, 2010; PCT Application No. PCT/EP2009/064818.

PCT Search Report, Feb. 22, 2010; PCT Application No. PCT/EP2009/057910.

Compaq Computer Corporation, et al. Advanced Configuration and Power Interface Specification Rev 2.0; Jul. 27, 2000; pp. 1-27 and 211-230.

Office Action, U.S. Appl. No. 11/285,325, USPTO Mail Date Mar. 18, 2008.

Notice of Allowance, U.S. Appl. No. 11/285,325, USPTO Mail Date Jul. 25, 2008.

Office Action, U.S. Appl. No. 11/946,506, USPTO Mail Date Jul. 21, 2009.

Final Office Action, U.S. Appl. No. 11/946,506, USPTO Mail Date Feb. 22, 2010.

Office Action, U.S. Appl. No. 11/946,506, USPTO Mail Date Nov. 28, 2007.

Office Action, U.S. Appl. No. 11/859,829, USPTO Mail Date Apr. 7, 2010.

Office Action, U.S. Appl. No. 11/946,506, USPTO Mail Date Nov. 22, 2010.

Office Action, U.S. Appl. No. 11/940,896, USPTO Mail Date Jun. 29, 2010.

Office Action, U.S. Appl. No. 11/940,896, USPTO Mail Date Dec. 3, 2010.

Final Office Action, U.S. Appl. No. 11/940,896, USPTO Mail Date Apr. 6, 2011.

Final Office Action, U.S. Appl. No. 11/946,506, USPTO Mail Date Apr. 11, 2011.

Office Action, U.S. Appl. No. 12/146,085, USPTO Mail Date May 19, 2011.

* cited by examiner

DYNAMICALLY MANAGING POWER CONSUMPTION OF A COMPUTER WITH GRAPHICS ADAPTER CONFIGURATIONS

BACKGROUND OF THE INVENTION

1. Field of the Invention

The field of the invention is data processing, or, more specifically, methods, apparatus, and products for dynamically managing power consumption of a computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

As computer software advances, hardware requirements for executing such computer software also advance. Increased hardware requirements typically include increased power consumption in computer systems. Consider computer gaming software as one example type of computer software for which hardware requirements and associated power consumption have increased greatly in the recent past. High power consuming graphics adapters capable of meeting graphics processing requirements of computer gaming software continue to consume larger amounts of power than an integrated graphics adapter, or other low-power graphics adapter, even when the computer system is not executing graphics-intensive computer gaming software. Such power consumption during idle, or nearly idle, periods of time, is inefficient and wasteful when alternative, low-power consuming graphic adapters, such as an integrated graphics adapter of a computer motherboard are available in most, if not all, computer systems.

SUMMARY OF THE INVENTION

Methods, apparatus, and products for dynamically managing power consumption of a computer, the computer including two or more graphics adapters, each graphics adapter configured to process graphics for display on a computer display, the computer having a number of graphics adapter configurations, each graphics adapter configuration including one or more of the graphics adapters. Dynamically managing power consumption of a computer according to embodiments of the present invention includes: monitoring, by a graphics driver, operation of a current graphics adapter configuration, the monitored operation characterized by a graphics processing load; determining, by the graphics driver in dependence upon the graphics processing load of the current graphics adapter configuration, whether operation of the current graphics adapter configuration conforms to predefined graphics processing criteria; if operation of the current graphics adapter configuration conforms to the predefined graphics processing criteria, processing graphics, by the graphics adapter, for display with the one or more graphics adapters of the current graphics adapter configuration; and if operation of the current graphics adapter configuration does not conform to the predefined graphics processing criteria, processing graphics, by the graphics adapter, for display with the one or more graphics adapters of another graphics adapter configuration.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
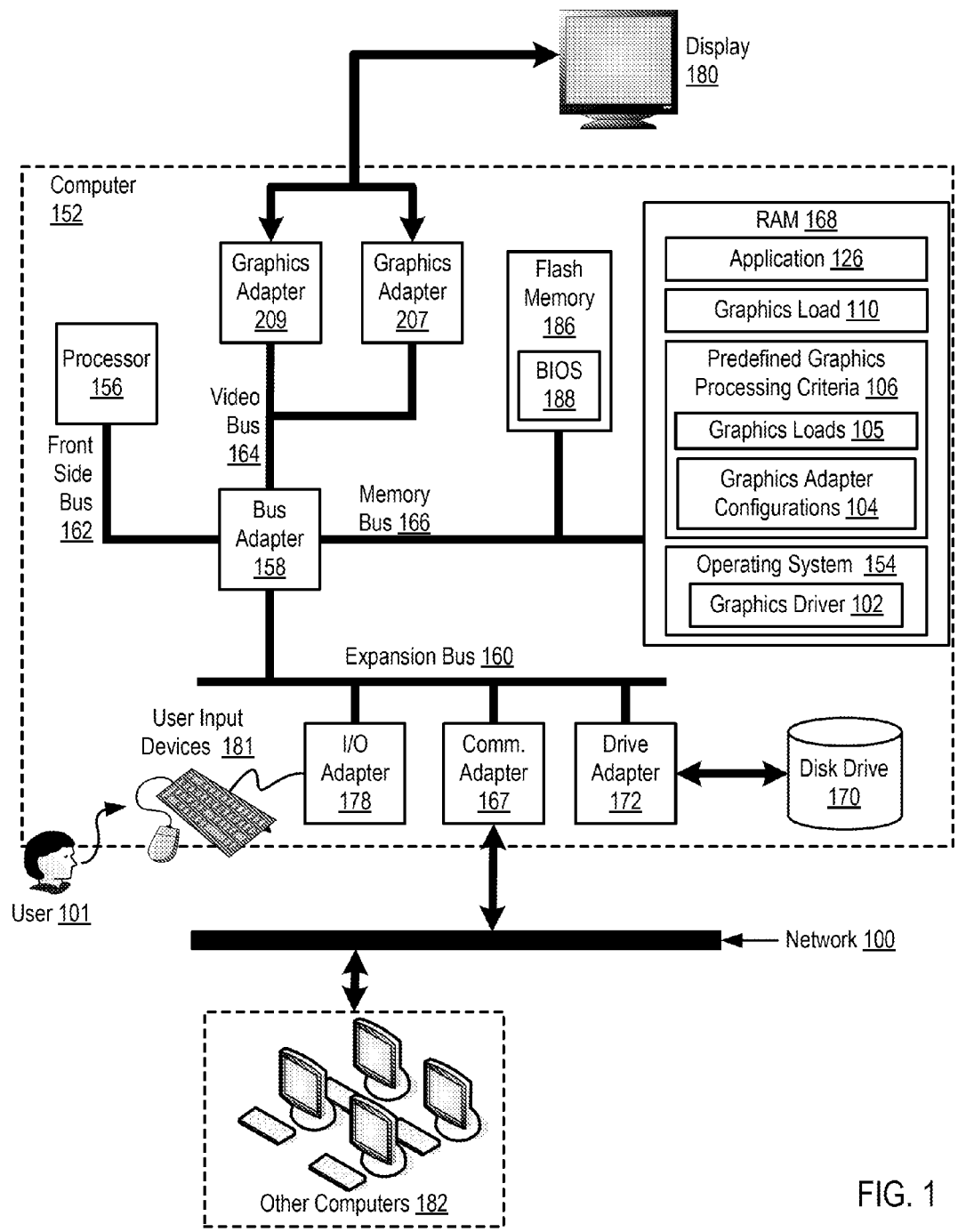
FIG. 1 sets forth a block diagram of an exemplary system for dynamically managing power consumption of a computer according to embodiments of the present invention.

Exemplary methods, apparatus, and products for dynamically managing power consumption of a computer in accordance with the present invention are described with reference to the accompanying drawings, beginning with FIG. 1. FIG. 1 sets forth a block diagram of an exemplary system for dynamically managing power consumption of a computer (152) according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) is an application (126), a module of computer program instructions that carries out user-level data processing tasks. Examples of such applications (126) include video games, spreadsheet applications, work processors, multimedia players, web browsers, and so on as will occur to readers of skill in the art. Also stored in RAM (168) is an operating system (154). Operating systems useful for dynamically managing power consumption of a computer according to embodiments of the present invention include UNIX™, Linux™, Microsoft XP™, AIX™, IBM's i5/OS™, and others as will occur to those of skill in the art.

The operating system (154) in the example of FIG. 1 includes a graphics driver (102), a module of computer program instructions that enables higher-level computer program applications to interact with the graphics adapters (207, 209). In addition to enabling higher-level computer program applications to interact with the graphics adapters (207, 209), the graphics driver (102) in the example of FIG. 1 also operates generally for dynamic power consumption management of the computer (152). Although the graphics driver (102) in the example of FIG. 1 is depicted as a software component of the operating system, readers of skill in the art will recognize that graphics drivers configured for dynamic power consumption management of a computer according to embodiments of the present invention may also be standalone modules of computer program instructions separate from an operating system. The operating system (154), graphics driver (102), and application (126), in the example of FIG. 1 are shown in RAM (168), but many components of such software typically are stored in non-volatile memory also, such as, for example, on a disk drive (170).

The example computer (152) of FIG. 1 also includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes two graphics adapters (207, 209), which are examples of I/O adapters specially designed for graphic output to a display device (180) such as a display screen or computer monitor. Graphics adapters (207, 209) are connected to processor (156) through a high speed video bus (164), bus adapter (158), and the front side bus (162), which is also a high speed bus.

The example computer (152) is configured with a number of graphics adapter configurations (104). Each graphics adapter configuration (104) identifies one or more of the graphics adapters (207, 209) to activate and use for graphics processing in particular graphics processing-related circumstances, referred to in this specification as predefined graphics processing criteria (106). The predefined graphics processing criteria (106) in the example of FIG. 1 is a data structure including an association of graphics loads (105) and graphics adapter configurations (104). A graphics load (105) is a metric of graphics processing operation or consumption, such as frame rates, graphics quality settings, or in some embodiments, particular user applications each of which may consume a different amount of graphics processing during execution. The predefined graphics processing criteria (106) in the example of FIG. 1 specifies a particular graphics adapter configuration (104) for each different graphics load (105).

The graphics driver (102), as mentioned above, in addition to enabling higher-level computer program applications to interact with the graphics adapters (207, 209) also operates generally for dynamic power management of the computer (152) in the example of FIG. 1. The graphics driver is said to manage power consumption 'dynamically' in that the graphics driver manages power consumption of the computer automatically, without human intervention, during operation of the computer. The graphics driver (102) may manage power consumption in the computer (152) by: monitoring operation of a current graphics adapter configuration (104), the monitored operation characterized by a graphics processing load (110); determining, in dependence upon the graphics processing load (110) of the current graphics adapter configuration (104), whether operation of the current graphics adapter configuration (104) conforms to predefined graphics processing criteria (106); if operation of the current graphics adapter configuration (104) conforms to the predefined graphics processing criteria (106), processing graphics for display with the one or more graphics adapters of the current graphics adapter configuration (104); and if operation of the current graphics adapter configuration (104) does not conform to the predefined graphics processing criteria (106), processing graphics for display with the one or more graphics adapters (207, 209) of another graphics adapter configuration (104).

In some computers for which power consumption is dynamically managed by a graphics adapter according to embodiments of the present invention, the graphics adapters (207, 209) include a graphics adapter integrated with the computer's main motherboard and a graphics adapter installed as a hardware component, a video card, in an expansion slot of the computer, such as Peripheral Component Interconnect ('PCI') slot or an Accelerated Graphics Port ('AGP') slot. Such integrated graphics adapters typically consume less power than a non-integrated, expansion graphics adapter. The graphics driver (102) then may manage power consumption in such a computer by processing graphics with the low-power consuming integrated graphics adapter when under a low graphics processing load and with the expansion graphics adapter when under a high graphics processing load. That is, the graphics driver manages power, reduces power consumption, by processing graphics with lower-power graphics adapter configurations when the computer is operating under a lower graphics processing load. In other computers in which power consumption is managed by the graphics according to embodiments of the present invention, the graphics adapters installed in the computer (152) may include, in addition to an integrated graphics adapter, a multi-Graphics Processing Unit ('GPU') graphics adapter, such as an ATI Technologies Crossfire™ graphics card or an nVidia™ Scalable Link Interface ('SLI') graphics card, where each GPU of the graphics card is capable of operating as an individual graphics adapter. That is, each graphics card includes multiple graphics adapters. In such computers in which such multi-GPU graphics card are installed, each GPU may be capable of consuming an equal amount of power. As such, the graphics driver may manage power consumption, reducing such power consumption, by processing graphics with fewer than all GPUs or only the integrated graphics adapter when the computer is operating under a low graphics processing load.

The computer (152) of FIG. 1 also includes flash memory (186) is connected through a high speed memory bus (166) and bus adapter (158) to processor (156). Stored in flash memory (186) is a Basic Input/Output Services ('BIOS') module (188), a module of computer program instructions, executed upon startup of the computer (152), that initializes system component hardware, through initial boot procedures, such as the graphics adapters (207, 209), hard disk drives (170), and floppy disk drives, and some other hardware devices. Such initialization prepares the computer into a known low-capability state, so other software programs, such as the operating system (154), stored in computer memory may be loaded, executed, and given control of the computer. The BIOS module (188) in the example of FIG. 1 may be configured such that upon startup and during initial boot procedures of the computer (152), the BIOS module (188) activates only a default graphics adapter configuration—a least power consuming graphics adapter of the computer (152). In most embodiments, the least power consuming graphics adapter (207, 209), the default graphics adapter, is the integrated graphics adapter, not an expansion adapter, as described above.

In computers of the prior art, the output of each separate graphics adapter installed in a computer enclosure is typically connected to a separate port. Outputs of separate graphics adapters installed in a computer enclosure of the prior art are typically not connected to the same input port of a computer display. In fact, a separate data communications cable typically connects each separate port to an input port on a separate display. That is, one display for each graphics adapter installed in a computer enclosure of the prior art. The outputs of the graphics adapters (207, 209) in the example computer (152) of FIG. 1, however, are configured for connection to the same input port of a computer display (180). In the example computer (152) of FIG. 1 for which power consumption is managed, the outputs of the two or more graphics adapters (207, 209) are connected, inside a computer enclosure, depicted in FIG. 1 by the dashed-line square enclosing the computer (152) components, to a same output port of the computer, the output port connecting the computer to a computer display. That is, the outputs of the graphics adapters are connected within the computer enclosure, and instead of having multiple separate output ports on a computer enclosure, the computer (152) of FIG. 1 is configured with only one output port.

The exemplary computer (152) of FIG. 1 also includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for dynamically managing power consumption of a computer according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The exemplary computer (152) of FIG. 1 also includes a communications adapter (167) for data communications with other computers (182) and for data communications with a data communications network (100). Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters useful in systems that dynamically manage power consumption of a computer according to embodiments of the present invention include modems for wired dial-up communications, Ethernet (IEEE 802.3) adapters for wired data communications network communications, and 802.11 adapters for wireless data communications network communications.

The arrangement of servers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art.

Various embodiments of the present invention may be implemented on a variety of hardware platforms in addition to those illustrated in FIG. 1.

Figure 2:
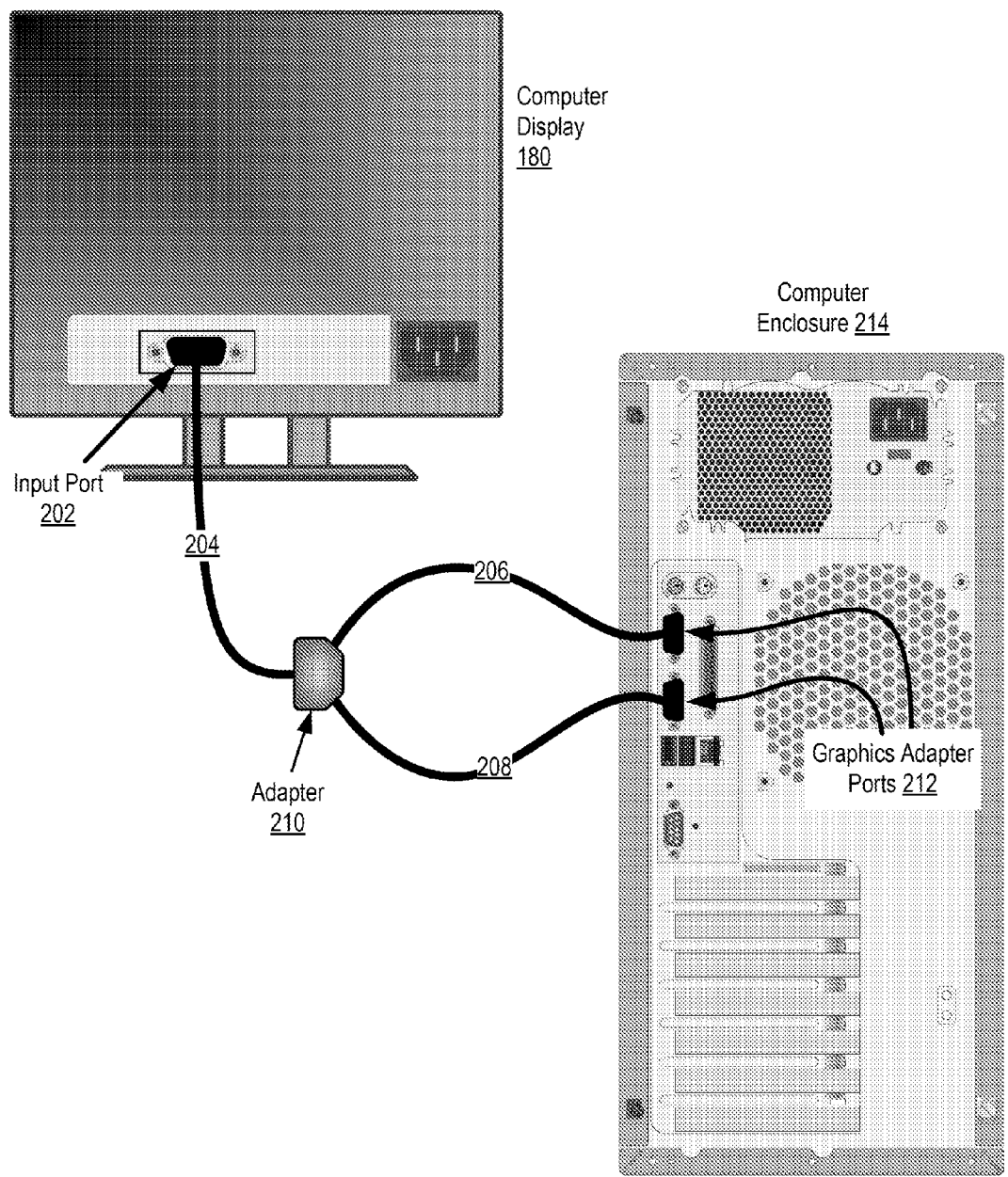
FIG. 2 sets forth a block diagram depicting an exemplary system in which power consumption of a computer is dynamically managed according to embodiments of the present invention.

As mentioned above, in computers of the prior art, the output of each separate graphics adapter installed in a computer enclosure is typically connected to a separate port. In computers for which power consumption is managed dynamically by a graphics driver according to embodiments of the present invention, the outputs of graphics adapters may be configured differently. For further explanation, therefore, FIG. 2 sets forth a block diagram depicting an exemplary system in which power consumption of a computer is dynamically managed according to embodiments of the present invention. The system of FIG. 2 includes a computer, enclosed in a computer enclosure (214) and a computer display (180). Installed in the computer enclosure (214) in the example system of FIG. 2 are two graphics adapters similar to those depicted in the example system of FIG. 1. The outputs of the two or more graphics adapters, represented in FIG. 2 by graphics adapter ports (212), are connected, external to the computer enclosure (214), to the same input port (202) of the computer display (180). In this example, the each graphics adapter output port (212) is connected by a data communications cable (206, 208) through an adapter (210) and another data communications cable (204) to one input port (202) of the computer display (180). In this way the graphics adapter may seamlessly, or near-seamlessly, alternate between processing graphics with the two graphics adapters. Furthermore, connecting the outputs of graphics adapters external to the computer enclosure enables implementation of dynamic power consumption management of a computer according to embodiments of the present invention with no need of hardware reconfiguration of currently configured computers and computer enclosures such as reconfiguration of motherboards Printed Circuit Board ('PCB') layouts, internal bus ports, internal data communications cables, port availability of enclosures, and so as will occur to readers of skill in the art.

Readers of skill in the art will immediately recognize that connecting multiple graphics adapter outputs to a single computer display (180) input port (202) is just one way among many to connect outputs of multiple graphics adapters to a display of a computer for which power consumption is managed by a graphics driver according to embodiments of the present invention. Another example way in which outputs of multiple graphics adapters to a display of a computer for which power consumption is managed by a graphics driver according to embodiments of the present invention includes connecting the output of each graphics adapter to a separate input of computer display. Computer displays may include multiple input ports such as, for example, a Video Graphics Array ('VGA') port, a Digital Visual Interface Port ('DVI') port, a DiplayLink™ Universal Serial Bus ('USB') port, and so on.

Figure 3:
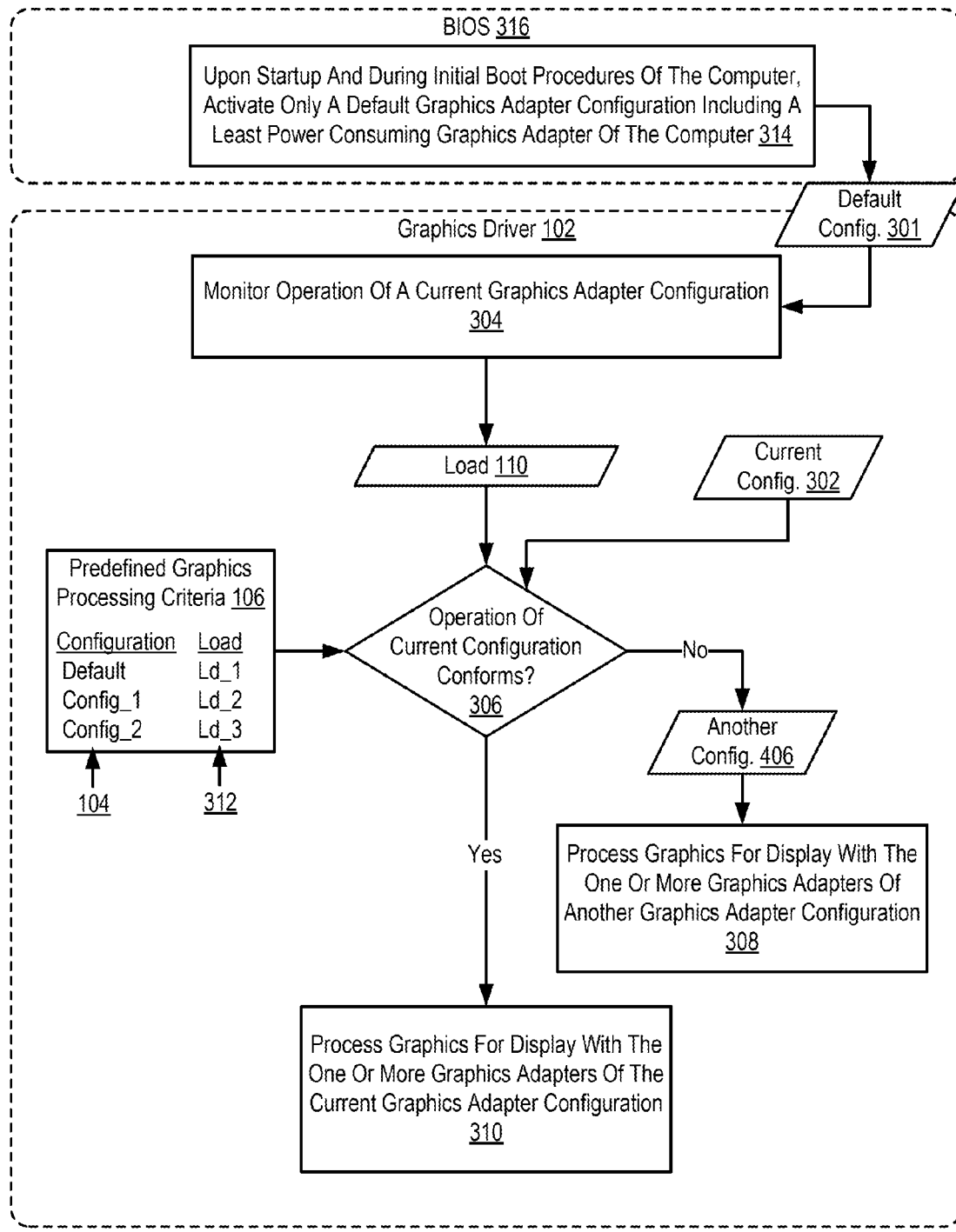
FIG. 3 sets forth a flow chart illustrating an exemplary method for dynamically managing power consumption of a computer according to embodiments of the present invention.

For further explanation, FIG. 3 sets forth a flow chart illustrating an exemplary method for dynamically managing power consumption of a computer according to embodiments of the present invention. The method of FIG. 3 is carried out in a computer configured similar to the computer of FIG. 1 above. Such a computer (152 on FIG. 1) includes two or more graphics adapters (207, 209 on FIG. 1) with each graphics adapter configured to process graphics for display on a computer display (180 on FIG. 1). The computer (152 on FIG. 1) is configured with a number of graphics adapter configurations (104) with each graphics adapter configuration (104) including one or more of the graphics adapters (207, 209 on FIG. 1).

Upon startup and during initial boot procedures of the computer, the method of FIG. 3 includes activating (314), by the BIOS module (316) of the computer, only a default graphics adapter configuration (301) including a least power consuming graphics adapter of the computer. Activating (314), by the BIOS module (316) of the computer, only a default graphics adapter configuration (301) including a least power consuming graphics adapter of the computer may be carried out by only initializing the graphics adapter integrated with the main motherboard of the computer.

The method of FIG. 3 also includes monitoring (304), by a graphics driver (102), operation of a current graphics adapter configuration, the monitored operation characterized by a graphics processing load (110). Monitoring (304), by a graphics driver (102), operation of a current graphics adapter configuration, the monitored operation characterized by a graphics processing load (110) may be carried out in several ways including monitoring frame display buffers, measuring an amount of time to display each frame on a computer display, receiving changes in graphics quality settings, monitoring application program launches, receiving function calls from higher-level application programs through an API exposed by the graphics driver that indicate changes in graphics processing loads, and so on as will occur to readers of skill in the art.

The method of FIG. 3 also includes determining (306), in dependence upon the graphics processing load (110) of the current graphics adapter configuration (302), whether operation of the current graphics adapter configuration conforms to predefined graphics processing criteria (106). In the method of FIG. 3 the predefined graphics processing criteria (106) is depicted as a table having a column of graphics adapter configurations (104) and a column of graphics processing loads (312). Each graphics adapter configuration (104) in the example predefined graphics processing criteria (106) table is associated with a particular load (312). Determining (306) whether operation of the current graphics adapter configuration conforms to predefined graphics processing criteria (106) includes determining whether the load (110) of the current graphics processing conforms to the load (312) associated with the current configuration (302) in the predefined graphics processing criteria (106).

If operation of the current graphics adapter configuration conforms to the predefined graphics processing criteria (106), the method of FIG. 3 continues by processing graphics for display with the one or more graphics adapters of the current graphics adapter configuration (302). That is, the graphics driver makes no changes in graphics adapter operation. If operation of the current graphics adapter configuration (302) does not conform to the predefined graphics processing criteria (106), however, the method of FIG. 3 continues by processing graphics for display with the one or more graphics adapters of another graphics adapter configuration (406). Processing graphics for display with the one or more graphics adapters of another graphics adapter configuration (406) includes identifying from the predefined graphics processing criteria (106) a graphics adapter configuration (406) that does in fact conform to the current graphics processing load (110) and activating the one or more graphics adapters of the configuration, by loading graphics adapter-specific graphics drivers.

Figure 4:
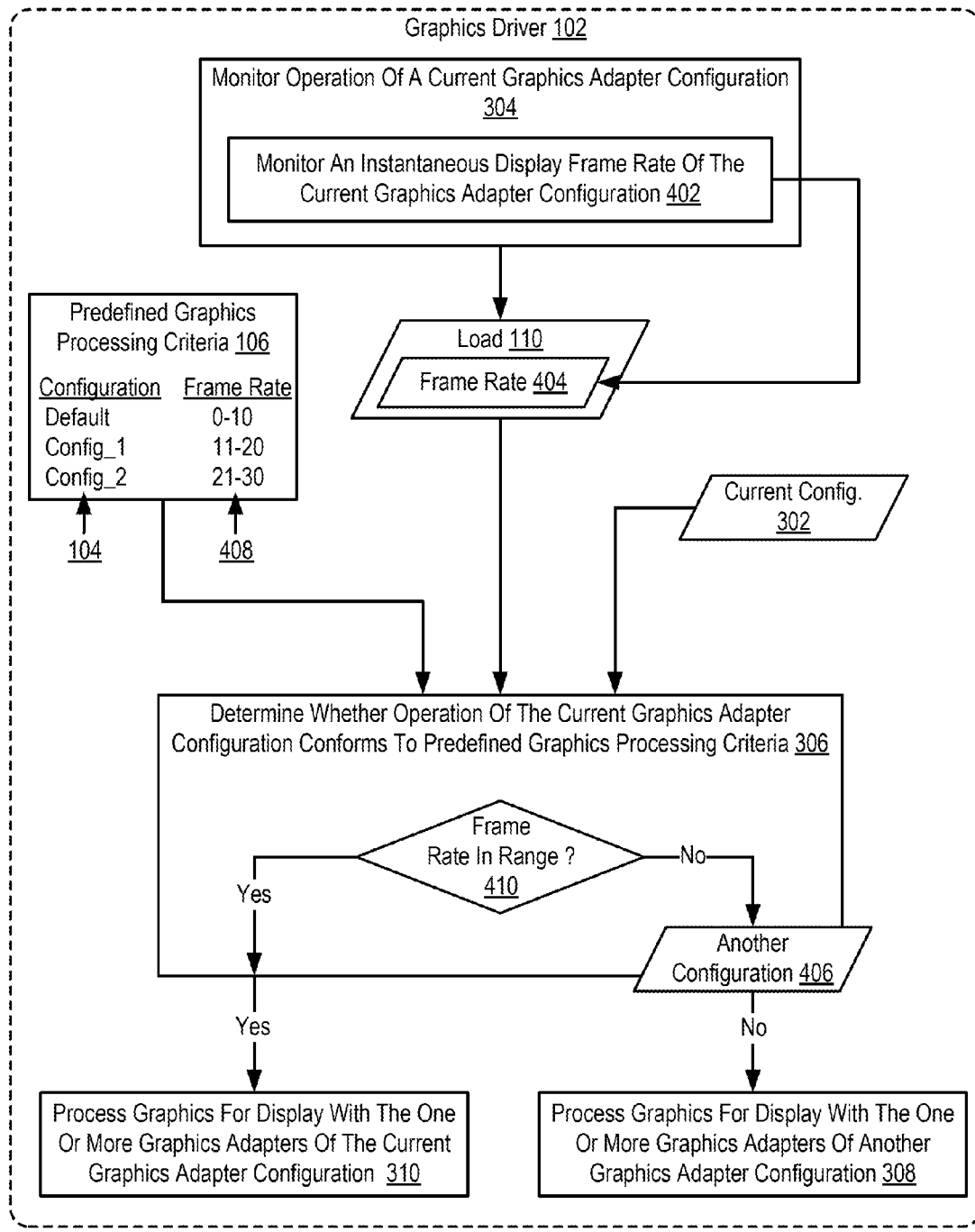
FIG. 4 sets forth a flow chart illustrating a further exemplary method for dynamically managing power consumption of a computer according to embodiments of the present invention.

For further explanation, FIG. 4 sets forth a flow chart illustrating a further exemplary method for dynamically managing power consumption of a computer according to embodiments of the present invention. The method of FIG. 4, like the method of FIG. 3, is carried out in a computer configured similar to the computer of FIG. 1 above. Such a computer (152 on FIG. 1) includes two or more graphics adapters (207, 209 on FIG. 1) with each graphics adapter configured to process graphics for display on a computer display (180 on FIG. 1). The computer (152 on FIG. 1) is configured with a number of graphics adapter configurations (104) with each graphics adapter configuration (104) including one or more of the graphics adapters (207, 209 on FIG. 1). The method of FIG. 4 is also similar to the method of FIG. 3 including as it does, the graphics driver's (102) monitoring (304) operation of a current graphics adapter configuration, the monitored operation characterized by a graphics processing load (110); determining (306), in dependence upon the graphics processing load (110) of the current graphics adapter configuration (302), whether operation of the current graphics adapter configuration conforms to predefined graphics processing criteria (106); if operation of the current graphics adapter configuration (302) conforms to the predefined graphics processing criteria (106), processing graphics for display with the one or more graphics adapters of the current graphics adapter configuration (302); and if operation of the current graphics adapter configuration (302) does not conform to the predefined graphics processing criteria (106), processing graphics for display with the one or more graphics adapters of another graphics adapter configuration (406). The method of FIG. 4 differs from the method of FIG. 3, however, in that in the method of FIG. 4 monitoring (304) operation of a current graphics adapter configuration, the monitored operation characterized by a graphics processing load (110) includes monitoring (402) an instantaneous display frame rate (404) of the current graphics adapter configuration (304). In the method of FIG. 4 determining (306) whether operation of the current graphics adapter configuration conforms to predefined graphics processing criteria (106) includes determining (410) whether the instantaneous display frame rate (404) of the current graphics adapter configuration (302) falls within a range of frame rates (408) specified by the predefined graphics processing criteria (106) for the current graphics adapter configuration (302).

Figure 5:
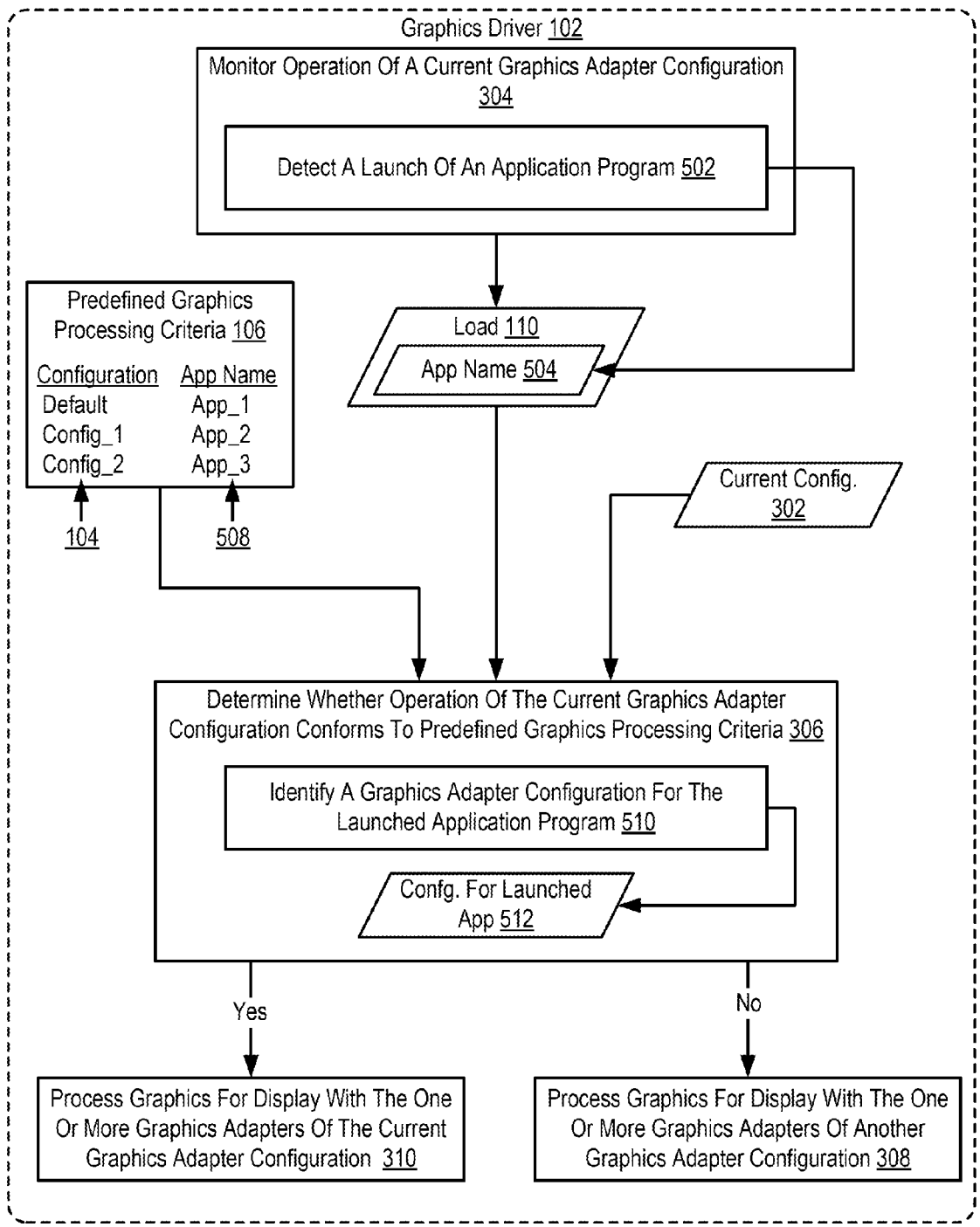
FIG. 5 sets forth a flow chart illustrating a further exemplary method for dynamically managing power consumption of a computer according to embodiments of the present invention.

For further explanation, FIG. 5 sets forth a flow chart illustrating a further exemplary method for dynamically managing power consumption of a computer according to embodiments of the present invention. The method of FIG. 5, like the method of FIG. 3, is carried out in a computer configured similar to the computer of FIG. 1 above. Such a computer (152 on FIG. 1) includes two or more graphics adapters (207, 209 on FIG. 1) with each graphics adapter configured to process graphics for display on a computer display (180 on FIG. 1). The computer (152 on FIG. 1) is configured with a number of graphics adapter configurations (104) with each graphics adapter configuration (104) including one or more of the graphics adapters (207, 209 on FIG. 1). The method of FIG. 5 is also similar to the method of FIG. 3 including as it does, the graphics driver's (102) monitoring (304) operation of a current graphics adapter configuration, the monitored operation characterized by a graphics processing load (110); determining (306), in dependence upon the graphics processing load (110) of the current graphics adapter configuration (302), whether operation of the current graphics adapter configuration conforms to predefined graphics processing criteria (106); if operation of the current graphics adapter configuration (302) conforms to the predefined graphics processing criteria (106), processing graphics for display with the one or more graphics adapters of the current graphics adapter configuration (302); and if operation of the current graphics adapter configuration (302) does not conform to the predefined graphics processing criteria (106), processing graphics for display with the one or more graphics adapters of another graphics adapter configuration (406).

The method of FIG. 5 differs from the method of FIG. 3, however, in that in the method of FIG. 5 monitoring (304) operation of a current graphics adapter configuration, the monitored operation characterized by a graphics processing load (110) includes detecting (502) a launch of an application program. Detecting (502) a launch of an application program may be carried out in various ways including subscribing to an operating system provided notification module that sends notification upon each launch, through computer program code in the fork-exec system command to notify the graphics driver, and in other ways as may occur by readers of skill in the art. Detecting (502) a launch of an application program may also include identifying the application program, typically by application program name (504).

In the method of FIG. 5 determining (306) whether operation of the current graphics adapter configuration conforms to predefined graphics processing criteria (106) includes identifying, in accordance with the predefined graphics processing criteria (106), a graphics adapter configuration (512) for the launched application program (508). Identifying a graphics adapter configuration (512) for the launched application program (508) may be carried out by finding in the predefined graphics processing criteria (106) a configuration (512) associated with the application name (504) of the launched application program.

Figure 6:
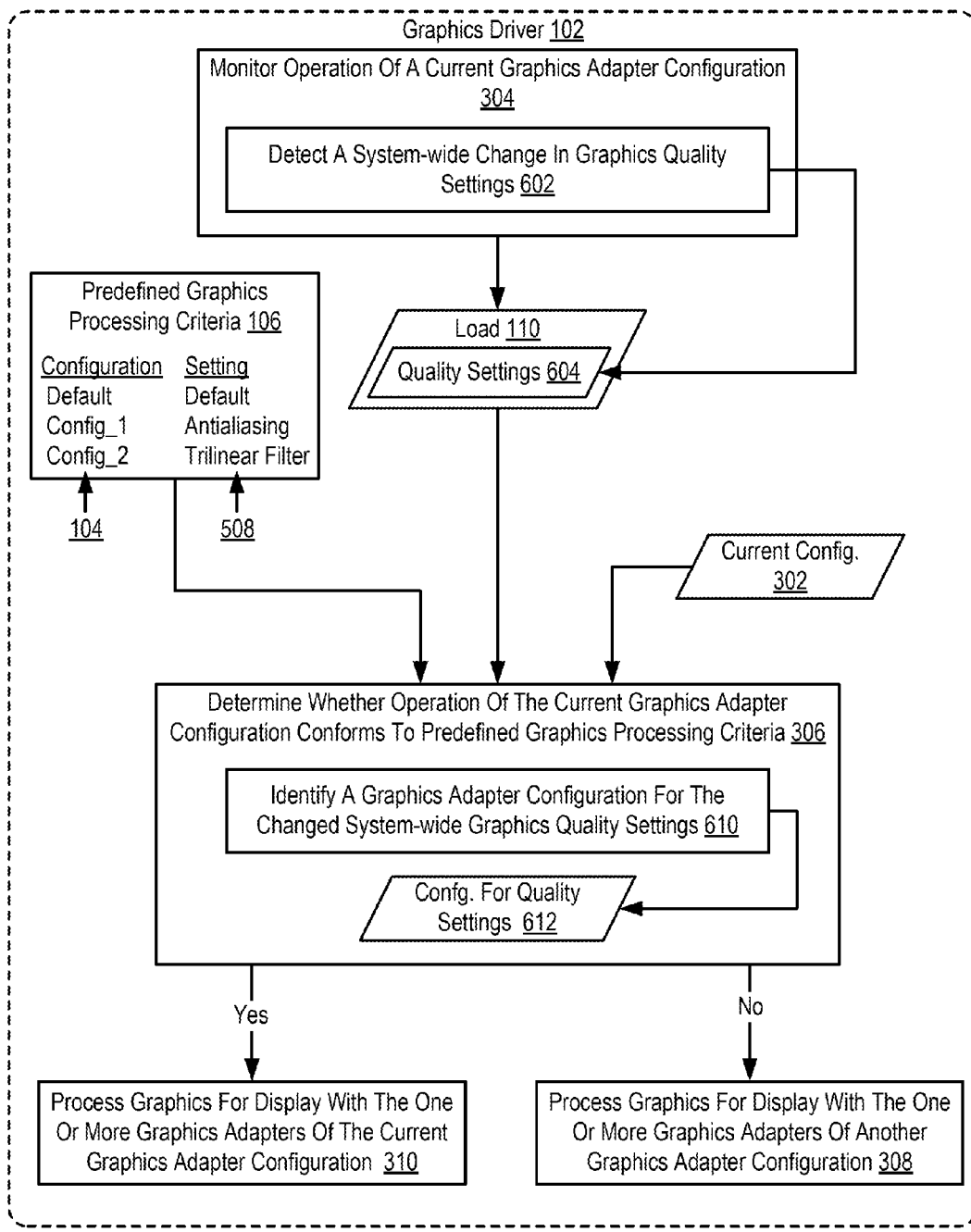
FIG. 6 sets forth a flow chart illustrating a further exemplary method for dynamically managing power consumption of a computer according to embodiments of the present invention.

For further explanation, FIG. 6 sets forth a flow chart illustrating a further exemplary method for dynamically managing power consumption of a computer according to embodiments of the present invention. The method of FIG. 6, like the method of FIG. 3, is carried out in a computer configured similar to the computer of FIG. 1 above. Such a computer (152 on FIG. 1) includes two or more graphics adapters (207, 209 on FIG. 1) with each graphics adapter configured to process graphics for display on a computer display (180 on FIG. 1). The computer (152 on FIG. 1) is configured with a number of graphics adapter configurations (104) with each graphics adapter configuration (104) including one or more of the graphics adapters (207, 209 on FIG. 1). The method of FIG. 6 is also similar to the method of FIG. 3 including as it does, the graphics driver's (102) monitoring (304) operation of a current graphics adapter configuration, the monitored operation characterized by a graphics processing load (110); determining (306), in dependence upon the graphics processing load (110) of the current graphics adapter configuration (302), whether operation of the current graphics adapter configuration conforms to predefined graphics processing criteria (106); if operation of the current graphics adapter configuration (302) conforms to the predefined graphics processing criteria (106), processing graphics for display with the one or more graphics adapters of the current graphics adapter configuration (302); and if operation of the current graphics adapter configuration (302) does not conform to the predefined graphics processing criteria (106), processing graphics for display with the one or more graphics adapters of another graphics adapter configuration (406).

The method of FIG. 6 differs from the method of FIG. 3, however, in that in the method of FIG. 6 monitoring (304) operation of a current graphics adapter configuration, the monitored operation characterized by a graphics processing load (110) includes detecting (502) a system-wide change in graphics quality settings (604). Examples of types of graphics quality settings include anisotropic filtering, bilinear texture filtering, trilinear filtering, antialising, display resolution, video color settings, and so on as will occur to those of skill in the art.

In the method of FIG. 6 determining (306) whether operation of the current graphics adapter configuration conforms to predefined graphics processing criteria (106) includes identifying (610), in accordance with the predefined graphics processing criteria (106), a graphics adapter configuration (612) for the changed system-wide graphics quality settings (604). The predefined graphics processing criteria (106) in the example of FIG. 6 includes records associating a graphics adapter configuration (104) with a graphics processing load, in this case a graphics quality setting (508). Identifying (610) a graphics adapter configuration (612) for the changed system-wide graphics quality settings (604) then, may be carried out by finding in the predefined graphics processing criteria (106) a configuration associated with the changed system-wide graphics quality settings (604).

In view of the explanations set forth above, readers will recognize that the benefits of dynamically managing power consumption of a computer according to embodiments of the present invention include:

high-power consuming graphics adapters are used for graphics processing when a computer system is under a high graphics processing load, effecting efficient use of such high-power consuming graphics adapters low-power consuming graphics adapters may are used when a computer system is under a lower graphics processing load, effecting little to no change in graphics processing quality provided by the computer from the prospective a computer user; and other benefits as will occur to readers of skill in the art.

Exemplary embodiments of the present invention are described largely in the context of a fully functional computer system for which power consumption is dynamically managing by a graphics driver executing on the computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically managing power consumption of a computer, the computer comprising two or more graphics adapters, each graphics adapter configured to process graphics for display on a computer display, the computer having a plurality of graphics adapter configurations, each graphics adapter configuration comprising one or more of the graphics adapters, the method comprising:
   monitoring, by a graphics driver, operation of a current graphics adapter configuration, the monitored operation characterized by a graphics processing load;
   determining, by the graphics driver in dependence upon the graphics processing load of the current graphics adapter configuration, whether operation of the current graphics adapter configuration conforms to predefined graphics processing criteria, the predefined graphics processing criteria having graphics adapter configurations that are each associated with particular graphics processing loads;
   if operation of the current graphics adapter configuration conforms to the predefined graphics processing criteria, processing graphics, by the graphics adapter, for display with the one or more graphics adapters of the current graphics adapter configuration; and
   if operation of the current graphics adapter configuration does not conform to the predefined graphics processing criteria, processing graphics, by the graphics adapter, for display with the one or more graphics adapters of another graphics adapter configuration.

2. The method of claim 1 further comprising:
   upon startup and during initial boot procedures of the computer, activating only a default graphics adapter configuration including a least power consuming graphics adapter of the computer.

3. The method of claim 2 wherein the least power consuming graphics adapter of the computer comprises a graphics adapter integrated with the computer's main motherboard.

4. The method of claim 1 wherein outputs of the two or more graphics adapters of the computer are connected, external to a computer enclosure, to a same input port of a computer display.

5. The method of claim 1 wherein outputs of the two or more graphics adapters of the computer are connected, inside a computer enclosure, to a same output port of the computer, the output port connecting the computer to a computer display.

6. The method of claim 1 wherein:
   monitoring operation of a current graphics adapter configuration further comprises monitoring an instantaneous display frame rate of the current graphics adapter configuration;
   determining, in dependence upon the graphics processing load of the current graphics adapter configuration, whether operation of the current graphics adapter configuration conforms to predefined graphics processing criteria further comprises determining whether the instantaneous display frame rate of the current graphics adapter configuration falls within a range of frame rates specified by the predefined graphics processing criteria for the current graphics adapter configuration.

7. The method of claim 1 wherein:
   monitoring operation of a current graphics adapter configuration further comprises detecting a launch of an application program; and
   determining, in dependence upon the graphics processing load of the current graphics adapter configuration, whether operation of the current graphics adapter configuration conforms to predefined graphics processing criteria further comprises identifying, in accordance with the predefined graphics processing criteria, a graphics adapter configuration for the launched application program.

8. The method of claim 1 wherein:
   monitoring operation of a current graphics adapter configuration further comprises detecting a system-wide change in graphics quality settings; and
   determining, in dependence upon the graphics processing load of the current graphics adapter configuration, whether operation of the current graphics adapter configuration conforms to predefined graphics processing criteria further comprises identifying, in accordance with the predefined graphics processing criteria, a graphics adapter configuration for the changed system-wide graphics quality settings.

9. Apparatus for dynamically managing power consumption of a computer, the computer comprising two or more graphics adapters, each graphics adapter configured to process graphics for display on a computer display, the computer having a plurality of graphics adapter configurations, each graphics adapter configuration comprising one or more of the graphics adapters, the apparatus comprising a computer processor, a computer memory operatively coupled to the computer processor, the computer memory having disposed within it computer program instructions capable of:
   monitoring, by a graphics driver, operation of a current graphics adapter configuration, the monitored operation characterized by a graphics processing load;
   determining, by the graphics driver in dependence upon the graphics processing load of the current graphics adapter configuration, whether operation of the current graphics adapter configuration conforms to predefined graphics processing criteria, the predefined graphics processing criteria having graphics adapter configurations that are each associated with particular graphics processing loads;
   if operation of the current graphics adapter configuration conforms to the predefined graphics processing criteria, processing graphics, by the graphics adapter, for display with the one or more graphics adapters of the current graphics adapter configuration; and
   if operation of the current graphics adapter configuration does not conform to the predefined graphics processing criteria, processing graphics, by the graphics adapter, for display with the one or more graphics adapters of another graphics adapter configuration.

10. The apparatus of claim 9 further comprising computer program instructions capable of:
    upon startup and during initial boot procedures of the computer, activating only a default graphics adapter configuration including a least power consuming graphics adapter of the computer.

11. The apparatus of claim 9 wherein outputs of the two or more graphics adapters of the computer are connected, external to a computer enclosure, to a same input port of a computer display.

12. The apparatus of claim 9 wherein outputs of the two or more graphics adapters of the computer are connected, inside a computer enclosure, to a same output port of the computer, the output port connecting the computer to a computer display.

13. The apparatus of claim 9 wherein:
monitoring operation of a current graphics adapter configuration further comprises monitoring an instantaneous display frame rate of the current graphics adapter configuration;
determining, in dependence upon the graphics processing load of the current graphics adapter configuration, whether operation of the current graphics adapter configuration conforms to predefined graphics processing criteria further comprises determining whether the instantaneous display frame rate of the current graphics adapter configuration falls within a range of frame rates specified by the predefined graphics processing criteria for the current graphics adapter configuration.

14. The apparatus of claim 9 wherein:
monitoring operation of a current graphics adapter configuration further comprises detecting a launch of an application program; and
determining, in dependence upon the graphics processing load of the current graphics adapter configuration, whether operation of the current graphics adapter configuration conforms to predefined graphics processing criteria further comprises identifying, in accordance with the predefined graphics processing criteria, a graphics adapter configuration for the launched application program.

15. The apparatus of claim 9 wherein:
monitoring operation of a current graphics adapter configuration further comprises detecting a system-wide change in graphics quality settings; and
determining, in dependence upon the graphics processing load of the current graphics adapter configuration, whether operation of the current graphics adapter configuration conforms to predefined graphics processing criteria further comprises identifying, in accordance with the predefined graphics processing criteria, a graphics adapter configuration for the changed system-wide graphics quality settings.

16. A computer program product for dynamically managing power consumption of a computer, the computer comprising two or more graphics adapters, each graphics adapter configured to process graphics for display on a computer display, the computer having a plurality of graphics adapter configurations, each graphics adapter configuration comprising one or more of the graphics adapters, the computer program product disposed in a computer readable, signal bearing medium, the computer program product comprising computer program instructions capable of:
monitoring, by a graphics driver, operation of a current graphics adapter configuration, the monitored operation characterized by a graphics processing load;
determining, by the graphics driver in dependence upon the graphics processing load of the current graphics adapter configuration, whether operation of the current graphics adapter configuration conforms to predefined graphics processing criteria, the predefined graphics processing criteria having graphics adapter configurations that are each associated with particular graphics processing loads;
if operation of the current graphics adapter configuration conforms to the predefined graphics processing criteria, processing graphics, by the graphics adapter, for display with the one or more graphics adapters of the current graphics adapter configuration; and
if operation of the current graphics adapter configuration does not conform to the predefined graphics processing criteria, processing graphics, by the graphics adapter, for display with the one or more graphics adapters of another graphics adapter configuration.

17. The computer program product of claim 16 further comprising computer program instructions capable of:
upon startup and during initial boot procedures of the computer, activating only a default graphics adapter configuration including a least power consuming graphics adapter of the computer.

18. The computer program product of claim 16 wherein:
monitoring operation of a current graphics adapter configuration further comprises monitoring an instantaneous display frame rate of the current graphics adapter configuration;
determining, in dependence upon the graphics processing load of the current graphics adapter configuration, whether operation of the current graphics adapter configuration conforms to predefined graphics processing criteria further comprises determining whether the instantaneous display frame rate of the current graphics adapter configuration falls within a range of frame rates specified by the predefined graphics processing criteria for the current graphics adapter configuration.

19. The computer program product of claim 16 wherein:
monitoring operation of a current graphics adapter configuration further comprises detecting a launch of an application program; and
determining, in dependence upon the graphics processing load of the current graphics adapter configuration, whether operation of the current graphics adapter configuration conforms to predefined graphics processing criteria further comprises identifying, in accordance with the predefined graphics processing criteria, a graphics adapter configuration for the launched application program.

20. The computer program product of claim 16 wherein:
monitoring operation of a current graphics adapter configuration further comprises detecting a system-wide change in graphics quality settings; and
determining, in dependence upon the graphics processing load of the current graphics adapter configuration, whether operation of the current graphics adapter configuration conforms to predefined graphics processing criteria further comprises identifying, in accordance with the predefined graphics processing criteria, a graphics adapter configuration for the changed system-wide graphics quality settings.

\* \* \* \* \*